United States Patent [19]

Hollaway, Jr.

[11] Patent Number: 4,683,270

[45] Date of Patent: Jul. 28, 1987

[54] POLYMERIC COMPOSITION AND METHOD OF PRODUCING SAME

[75] Inventor: Gerald C. Hollaway, Jr., Springfield, Mo.

[73] Assignee: Dayco Products, Inc., Dayton, Ohio

[21] Appl. No.: 798,789

[22] Filed: Nov. 18, 1985

Related U.S. Application Data

[63] Continuation-in-part of Ser. No. 693,950, Jan. 23, 1985, abandoned.

[51] Int. Cl.$^4$ ............................................. C08C 19/20
[52] U.S. Cl. ................................. 525/347; 524/34; 524/36; 524/442; 525/330.9; 525/331.1; 525/348; 525/349
[58] Field of Search ............... 525/169, 178, 347, 348, 525/349, 375, 379, 330.9, 331.1; 524/34, 36, 442

[56] References Cited

U.S. PATENT DOCUMENTS

| | | | |
|---|---|---|---|
| 2,989,504 | 6/1961 | Little | 525/331.1 |
| 3,370,051 | 2/1968 | Sullivan | 525/349 |
| 3,780,001 | 12/1973 | Son | 525/331.1 |
| 4,209,596 | 6/1980 | Hashimoto et al. | 525/333 |
| 4,371,668 | 2/1983 | Ikeda | 525/133 |

OTHER PUBLICATIONS

The Neoprenes, R. M. Murray and D. C. Thompson, p. 28—date: 1963.

Primary Examiner—Christopher Henderson
Attorney, Agent, or Firm—Joseph V. Tassone

[57] ABSTRACT

The present invention relates to a polymeric composition which may be processed with increased scorch safety while retaining good physical properties. The composition of the invention comprises the combination of a specific retarder (vulcanization inhibitor) and at least one of two specific accelerators, and such composition prevents premature vulcanization of the chloroprene while it is being mixed and processed, yet provides excellent cure characteristics at the proper time, producing polymeric products with excellent dynamic properties.

22 Claims, 2 Drawing Figures

POLYMERIC COMPOSITION AND METHOD OF PRODUCING SAME

BACKGROUND OF THE INVENTION

This application is a continuation in part of U.S. Ser. No. 693,950 filed Jan. 23, 1985, now abandoned.

1. Field of the Invention

The present invention relates to polymeric compositions which may be processed with increased scorch safety while retaining good physical properties. This is of particular benefit when said compositions have a high viscosity.

2. Description of the Related Art

In the prior art, it is known to increase the load carrying capacity of an endless power transmission belt by incorporating up to 20 phr (parts per hundred rubber) of discrete fibers, by weight, into at least the compound utilized in the compression section of the belt. It has been proposed then, that increasing the amount of fiber in a belt compound (the fiber can be aramid fiber, nylon fiber, cellulose fiber, or similar fiber) that the ability of the belt could be increased even more. It was found, however, that when a chloroprene composition that was used to make a power transmission belt was loaded with about 40 phr fiber, the increased viscosity of the composition and the increased time to mix the fiber into the composition to obtain good fiber dispersion, that the heat generated by mixing and processing caused the composition to cure in the mixer or in subsequent processing. This is commonly referred to as scorching. In order to avoid this problem, it is known to utilize retarders (chemicals that slow down the cure of a polymer) to inhibit scorching. For example, see U.S. Pat. No. 3,780,001 to Son, wherein Son teaches the use of oxamides as retarders and at least morpholines as accelerators in elastomer curing systems.

It was found, however, that most common retarders used for chloroprenes, although they increase scorch safety, cause the elastic modulus and other critical properties of the composition for a belt to change such that the overall effect is detrimental to the performance of the belt. For example, Murray, R. M. and Thompson, D. C. in THE NEOPRENES page 28 state that "MBT, MBTS, and RPA No. 3 also retard scorch but have a persistent retarding effect which impairs development of a high state of cure even after prolonged curing".

It is also well known in the art to establish the state of vulcanization by the rheometer data and to establish the scorch safety in a similar manner. For example, U.S. Pat. Nos. 4,209,596 and 4,371,668, incorporated by reference herein, discuss methods of developing compounds and compound blends in the presence of vulcanization agents and retarders showing in particular rheometer curves and related tables of data. The cited references show these methods as well as data developed from stress-strain tensile testing machines.

It is also known to provide accelerators or cross-linking agents to enhance the state of cure in chloroprene compositions. For example, Sullivan, in U.S. Pat. No. 3,370,051 teaches the use of 3-substituted, 2-thiazolidinethione accelerators in polychloroprene curing systems but does not discuss the effect of retarders on his novel curing agents.

Little, in U.S. Pat. No. 2,989,504, teaches the use of maleimide accelerators in rubber curing systems but also does not discuss the effect of retarders on his novel curing agents nor does Little acknowledge the use of maleimides in chloroprene compositions.

These references do not teach or suggest the specific curing system described and claimed herein as they relate to chloroprene compositions and in fact do not teach nor even suggest the use of di-morpholino disulfide as a retarder for chloroprene.

It is desirable to provide a retarder for chloroprene compositions which does not inhibit the development of high modulus. It is also desirable to provide an accelerator to produce rapid development of modulus (cure rate) once the composition has had time to flow or mold which does not significantly reduce the scorch time.

It is particularly desirable to produce a high viscosity or a high fiber loaded chloroprene composition which is resistant to scorching, yet retains excellent elastic modulus and other critical properties as a composition for a power transmission belt.

SUMMARY OF THE INVENTION

In accordance with the present invention, there is provided a polymeric composition, preferably chloroprene, utilizing di-morpholino disulfide as a retarder, and at least one accelerator selected from N-methyl-2-thiazolidinethione, and N,N'-m-phenylene dimaleimide and mixtures thereof.

DETAILED DESCRIPTION OF THE INVENTION

The polymeric composition of this invention is prepared by mixing together the various materials in a manner which is conventional in the art. These materials include the polymer (preferably chloroprene), at least one metallic oxide, at least one organic acid, antioxidants, antiozonants, and at least one reinforcing filler, a retarder, special processing aids and an accelerator which activates the vulcanization of the composition. Such accelerators are known in the art and may be found in the teachings of Sullivan in his U.S. Pat. No. 3,370,051 or the book by Murray and Thompson. When there is a need for a composition which has increased physical properties, such as durometer, modulus and the like, it is common to incorporate into a conventional chloroprene composition unusually high loadings of fiber and/or carbon black. Such loadings may include up to 100 phr fibers selected from the group consisting of, for example, nylon, aramid, cellulose, polyester, graphite, and glass fibers. The high fiber loading in a polymer composition, or increased concentrations of carbon black, cause the viscosity of the composition to increase in proportion to the amount of the loading. It is obvious to those skilled in the art that increased loadings of either fiber or carbon black cause a reduction in processing safety, otherwise known as scorch. Conventional practice dictates that a retarder be utilized to improve processing safety. The retarder is provided to prevent premature vulcanization of the chloroprene during mixing of the composition because of the heat generated by the mixing of the fibers or carbon black into the composition and because of the extended period of time needed for the mixing due to the high viscosity of the composition. In some subsequent processing steps, including, for instance, calendering and extruding, these high viscosity compositions cause high heat generation and therefore require increased processing safety.

Likewise, these high viscosity compositions require longer flow times during molding to completely mold the product. This is accomplished by providing increased scorch safety.

Figure 1:
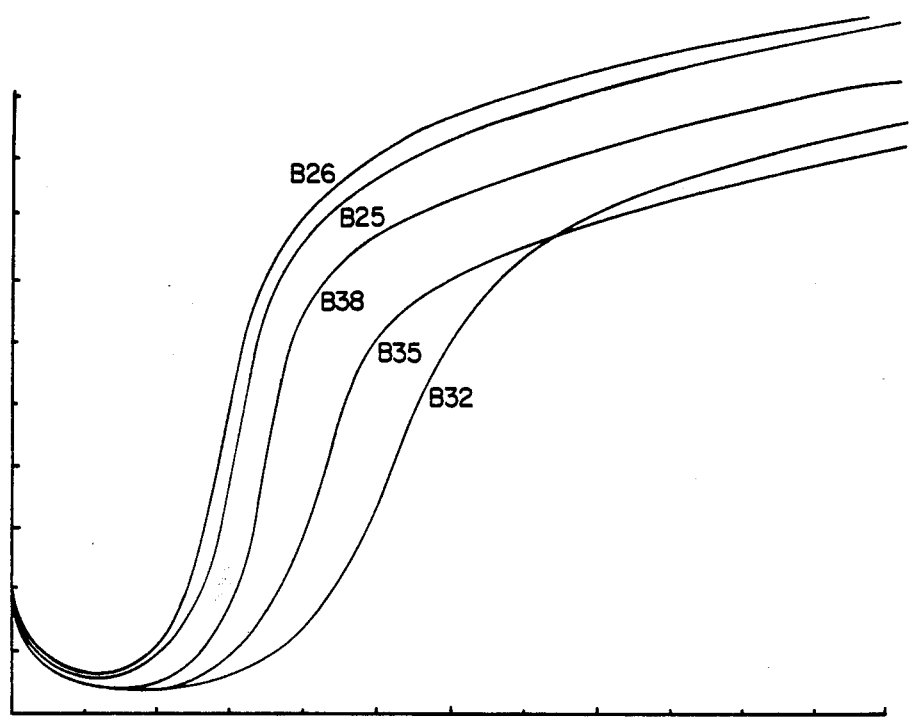
FIG. 1 is a reproduction of rheometer curves of compositions comparing various chloroprene retarders known in the art as compared to the use of di-morpholino disulfide as claimed in this invention.

Those skilled in the art are familiar with the Monsanto Mooney Viscometer and with the use of this machine and its associated test procedures to determine the scorch of compounds and the parts of the scorch curve. The first part of the curve describes the minimum rotor torque required to shear the rubber compound placed between the platens of the viscometer. The second part of the curve begins after the minimum point and generally relates to the scorching or curing rate of the particular compound at a particular temperature. Values typically used to describe the scorch rate of compounds from the scorch curve are minimum torque, $T_1$ defined as time to a one point rise after the minimum viscosity point and $T_{10}$ similarly defined as time to a ten point rise after the minimum. Increased scorch safety can be readily determined from this scorch curve by observing the increase in time to a one or ten point rise ($T_1$ or $T_{10}$). For example, it can be seen from Table 1 that in the 275° scorch test the time to a one point rise $T_1$ increases from 8.3 minutes for compound B16 to 21.7 minutes for compound B34 where the amounts of the retarder have been increased from 0 phr to 4 phr. Similarly, the Monsanto Oscillating Disc Rheometer (ODR) may be utilized to determine typical values for processing safety, curing rate and maximum ODR torque, a measure of the modulus of the compound. The first upward turn of the curve is the onset of the vulcanization process, and therefore, a delay in this onset is an indication of increased scorch safety. The maximum torque reached in the given time span of the rheometer graph is an indication of the state of cure. Referring now to FIG. 1, which is a graphic representation of the compounds presented in Table 2, note that curve B-26 (MBTS) and curve B-25 (TMTM) show rapid onset of vulcanization whereas curves B-38 (Sulfads) and B-35 (Morfax) show some delayed onset of cure and curve B-32 shows significant delay. The foregoing chemicals are usually used as either curing agents or accelerators in compounds other than chloroprene. Murray and Thompson teach that some of these chemicals, when used in chloroprene, act effectively as retarders. Murray and Thompson also state that at least MBTS also causes a significant reduction in the cured modulus of the chloroprene compound. It can been seen then from FIG. 1 that this decrease in modulus is typical of chemicals used as retarders in chloroprene except in the case of the inventive composition (B-32).

In addition to the retarder, an accelerator, which activates the vulcanization of the composition at the proper time, is provided. It has been found that N-methyl 2-thiazoladinethione, and N,N'-m-phenylene dimaleimide and mixtures thereof have the correct accelerating properties such that when they are in a high viscosity chloroprene composition used to make a polymeric product, with the specific retarder mentioned above, that curing is substantially delayed until the vulcanization step, and when vulcanization takes place, the chloroprene polymer achieves optimum properties.

The following definitions define ingredients from the tables of compositions on the following pages which illustrate these properties:

| | |
|---|---|
| Neoprene GNA/GRT | Chloroprene manufactured by DuPont |
| N762/N650 | Carbon black |
| Silica | Precipitated hydrated amorphous silica |
| Oil | Aromatic processing oil type 102 |
| High aromatic oil | High molecular weight oil |
| ZnO | French process zinc oxide |
| ODP | Octylated diphenylamine |
| MgO | High activity magnesium oxide |
| Sulfasan R | di-morpholino disulfide sold by Monsanto |
| Vulkacit CRV | N—methyl-2-thiazolidinethione sold by Mobay |
| MBTS | 2,2'Di-Benzothiazyl disulfide |
| ETU | Ethylene thiourea |
| TMTM | Tetramethyl thiuram monosulfide |
| Morfax | 4-morpholinyl-dithio-benzothiazole disulfide manufactured by R. T. Vanderbilt |
| Sulfads | Dipentomethylene thiuram tetrasulfide manufactured by R. T. Vanderbilt |
| HMMM | Powdered 72% active Hexamethoxymethyl-melamine |
| HVA-2 | N, N'—m-phenyl dimaleimide manufactured by DuPont |
| Polymel 7 | Polyethylene manufactured by Polymel Co. |
| Sulfur | Elemental sulfur |
| ¼" Nylon | Six denier tire cord chopped to ¼" length |
| SRF 1501 | Resorcinol Donor sold by Schenectady Chemical |
| Stearic Acid | Stearic Acid |

Figure 2:
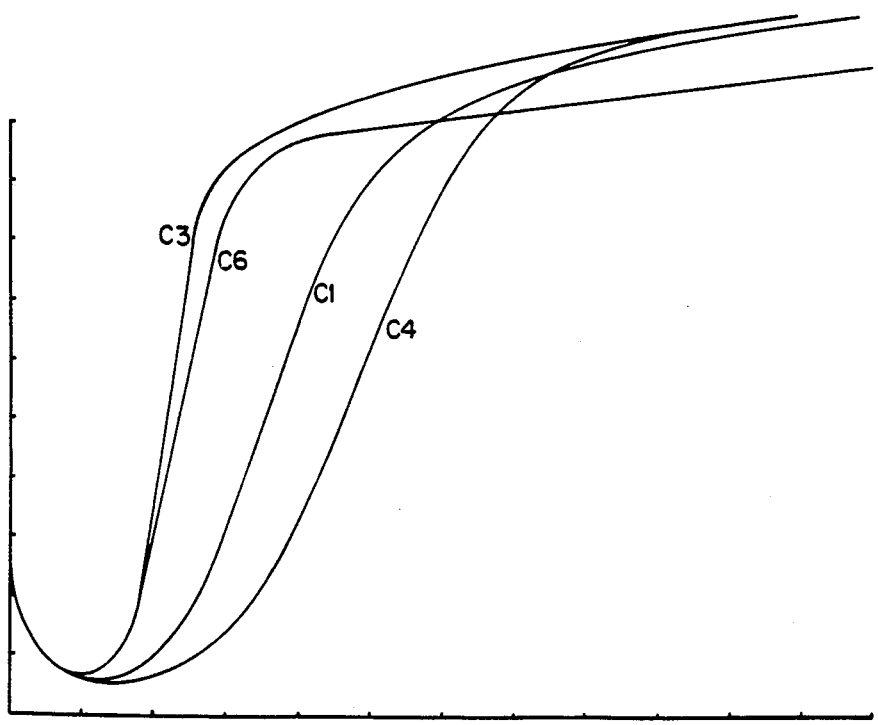
FIG. 2 is a reproduction of rheometer curves of the compositions of the preferred embodiments of the invention compared to conventional curing systems for chloroprene.

The properties desired in delaying the cure of the composition are best graphically illustrated by the position of the cure curve on the abscissa (time axis) of a graph, as is illustrated in FIGS. 1 and 2. It should be noted that the torque units in the ODR test at 320° F., using a 3 degree arc (in the ocillations of the disc) cannot be directly compared with the torque units in the scorch test because different equipment, using different calibrations are used in the two tests.

Compositions containing increasing amounts of di-morpholino disulfide were prepared to determine the effect of significantly increased scorch safety on other physical properties. As is illustrated in Table 1, dimorpholine disulfide increases scorch safety without significantly reducing the other physical properties. For example, as the amount of dimorpholine disulfide is increased from 0 phr (B-16) to 4 phr (B-34) a significant increase in processing safety is noted in either the $T_1$ or $T_{10}$ values while the tensile modulus of the compounds is highest at 1 phr, (B-17), but is not significantly lower even at 4 phr, (B-34). This decrease is insignificant compared to the compound containing 0 phr (B-16) while significantly increasing safety from 8.3 minutes $T_1$ of (B16) to 21.7 minutes $T_1$ of (B-34).

The tests in the tables on the Dynamic Instron were conducted at room temperature, 20 cycles per second compression at a mean stroke of 0.050 for a total of 12000 cycles. The Dynamic Quotient (D.Q.) is expressed as the quotient of compressive modulus and hysteresis. A higher D.Q. is a measure of resistance to fatigue.

TABLE 1

| | B16 | B17 | B-8 | B19 | B34 |
|---|---|---|---|---|---|
| VULKACIT CRV/SULFSAN R | | | | | |
| Db-6004 | | | | | |
| Neoprene GNA | 100 | 100 | 100 | 100 | 100 |
| N650 | 44 | 44 | 44 | 44 | 44 |

TABLE 1-continued

|  | B16 | B17 | B-8 | B19 | B34 |
|---|---|---|---|---|---|
| High Aromatic Oil | 7.8 | 7.8 | 7.8 | 7.8 | 7.8 |
| Stearic Acid | 1.5 | 1.5 | 1.5 | 1.5 | 1.5 |
| MgO | 4 | 4 | 4 | 4 | 4 |
| ODP | 3 | 3 | 3 | 3 | 3 |
| ZnO | 4 | 4 | 4 | 4 | 4 |
| Sulfur | 1 | 1 | 1 | 1 | 1 |
| Vulkacit CRV | 0.25 | 0.25 | 0.25 | 0.25 | 0.25 |
| Sulfasan R | — | 1 | 2 | 3 | 4 |
| Original Stress-Strain | | | | | |
| Cured 30' at 320° F. | | | | | |
| Tensile, psi | 2630 | 3100 | 2600 | 2730 | 2550 |
| Elongation (Percent) | 280 | 295 | 275 | 310 | 270 |
| 50% Modulus | 510 | 400 | 350 | 355 | 410 |
| 100% Modulus | 1075 | 900 | 775 | 760 | 825 |
| 200% Modulus | 2475 | 2250 | 1925 | 1875 | 2000 |
| Durometer, D | 29 | 29 | 34 | 27 | 33 |
| 250° F. "C" Tear | 132 | | 127 | 107 | 107 |
| Mooney Scorch at 275° F. | | | | | |
| $T_1$ (time in minutes) | 8.3 | 10.0 | 11.4 | 18.0 | 21.7 |
| $T_{10}$ (time in minutes) | 13.7 | 17.7 | 6 pt @ 24' | 4 pt @ 24' | 2 pt @ 24' |
| Minimum (torque units) | 12.5 | 12.5 | 9.0 | 9.6 | 9.5 |
| ODR TORQUE AT 320° F., 3 DEGREES ARC | | | | | |
| Minimum (torque units) | 2.75 | | 4.0 | 3.5 | 4.0 |
| Torque At 24' | 117 @ 60' | | 102 | 102.5 @ 60' | 98 @ 60' |
| DYNAMIC INSTRON | | | | | |
| Compressive Modulus | 858 | 865 | 861 | 732 | 711 |
| Hysteresis | 11.7 | 12.7 | 12.3 | 15.6 | 3.9 |
| D.Q. | 73.3 | 68.1 | 70 | 46.9 | 182 |

Compositions containing chloroprene were prepared as known in the art including identical amounts of previously known retarders as well as the chemical di-morpholino disulfide. Table 2 shows representative compositions and FIG. 1 is the graphic comparison of the use of dimorpholine disulfide with identical amounts of several previously used retarders. The retarding effect of di-morpholino disulfide can also be determined from Table 2 by comparing the $T_{10}$ values with other compositions. The $T_{10}$ value for the composition containing TMTM (B-26) is 13.9 minutes, where as the composition containing MBTS (B-25) is 14.4 minutes.

TABLE 2

|  | B26 | B25 | B38 | B35 | B32 |
|---|---|---|---|---|---|
| THE EFFECT OF SULFASAN R ON VULKACIT CRV | | | | | |
| Db-6004 | | | | | |
| Neoprene GNA | 100 | 100 | 100 | 100 | 100 |
| N650 | 44 | 44 | 44 | 44 | 44 |
| High Aromatic Oil | 7.8 | 7.8 | 7.8 | 7.8 | 7.8 |
| Stearic Acid | 1.5 | 1.5 | 1.5 | 1.5 | 1.5 |
| MgO | 4 | 4 | 4 | 4 | 4 |
| ODP | 3 | 3 | 3 | 3 | 3 |
| ZnO | 4 | 4 | 4 | 4 | 4 |
| Sulfur | 1 | 1 | 1 | 1 | 1 |
| Vulkacit CRV | 0.25 | 0.25 | 0.25 | 0.25 | 0.25 |
| TMTM | 2 | — | — | — | — |
| MBTS | — | 2 | — | — | — |
| Morfax | — | — | 2 | — | — |
| Sulfads | — | — | — | 2 | — |
| Sulfasan R | — | — | — | — | 2 |

TABLE 2-continued

|  | B26 | B25 | B38 | B35 | B32 |
|---|---|---|---|---|---|
| Original Stress-Strain | | | | | |
| Cured 30' at 320° F. | | | | | |
| Tensile, psi | 3060 | 2375 | 2475 | 2750 | 2500 |
| Elongation (Percent) | 280 | 265 | 255 | 305 | 275 |
| 50% Modulus | 400 | 450 | 490 | 390 | 350 |
| 100% Modulus | 890 | 1000 | 1000 | 825 | 775 |
| 200% Modulus | 2250 | 2375 | 2225 | 1950 | 1925 |
| Durometer, D | 29 | 29 | 34 | 33 | 34 |
| 250° F. "C" Tear | | | 118 | 127 | 119 |
| Mooney Scorch at 275° F. | | | | | |
| $T_1$ (time in minutes) | 8.8 | 8.2 | 12.1 | 14.3 | 17.6 |
| $T_{10}$ (time in minutes) | 13.9 | 14.4 | 18.9 | 20.9 | 4.5 pt @ 24' |
| Minimum (torque units) | 14.0 | 10.9 | 10.5 | 10.0 | 12.0 |
| DYNAMIC INSTRON | | | | | |
| Compressive Modulus | 803 | 771 | 801 | 801 | 706 |
| Hysteresis | 10.3 | 9.8 | 1.5 | 1.5 | 3.7 |
| D.Q. | 78.0 | 78.7 | 534 | 534 | 191 |

Some retarding effect is noted with the use of Morfax (B-38), $T_{10}$ equals 18.9, and Sulfads (B-35), where $T_{10}$ equals 20.9, but a significant retarding effect is noted using the inventive composition containing di-morpholino disulfide where $T_{10}$ is only 4.5 points rise in 24 minutes. It can be seen therefore, that chloroprene compositions containing di-morpholino disulfide can be produced with a significant increase in scorch safety. It will be noted that the invention, curve B-32, shows significant delay in the onset of vulcanization as compared to the previous curves.

Table 3 shows that N,N'-m-phenyl dimaleimide (C-4) when used with dimorpholino disulfide provides significantly longer scorch safety than N-methyl-2-thiazolidinethione (C-1) while maintaining the high ODR maximum torque. FIG. 2 shows this increased safety and high maximum torque in graphic representation. Comparing curve (C-4) with (C-1), the table illustrates that the torque at the end of the curve is approximately equal, while the onset of vulcanization is delayed significantly in the composition C-4 using N,N'-m-phenyl dimaleimide.

It was found that replacing the ETU and Sulfur with N-methyl-2 thiazolidinethione caused a reduction in physical properties, particularly the 100% modulus (C-6). Replacing the MBTS with di-morpholino disulfide, increased scorch safety and also increased the physical properties near to the properties of the original compound. Comparing the 100% modulus figures shows (C-3) and (C-1) to be nearly equal. The use of N,N'-m-phenyl dimaleimide increased physical properties further raising the 100% modulus from 725 to 850 and a synergistic effect was noted in a further increase in scorch safety from 13.0 to 14.9 minutes $T_1$. It is apparent, therefore, that the use of di-morpholino disulfide and either N-methyl 2-thiazolidinethione or N,N'-m-phenyl dimaleimide are useful in retarding the cure rate of chloroprene compositions while not significantly affecting other properties.

TABLE 3

| CONVENTIONAL AND INVENTIVE COMPOSITIONS | | | | |
|---|---|---|---|---|
|  | C3 | C6 | C1 | C4 |
| 83CR1013 | | | | |
| Neoprene GNA | 100 | 100 | 100 | 100 |
| N762 | 50 | 50 | 50 | 50 |
| MgO | 4 | 4 | 4 | 4 |

TABLE 3-continued

CONVENTIONAL AND INVENTIVE COMPOSITIONS

|  | C3 | C6 | C1 | C4 |
|---|---|---|---|---|
| Stearic Acid | 1.5 | 1.5 | 1.5 | 1.5 |
| ODP | 3 | 3 | 3 | 3 |
| Sulfasan R | — | — | 2 | 2 |
| MBTS | 0.75 | 2 | — | — |
| ZnO | 4 | 5 | 5 | 5 |
| Vulkacit CRV | — | 0.5 | 0.5 | — |
| ETU | 0.25 | — | — | — |
| Sulfur | 1 | — | — | — |
| HVA-2 | — | — | — | 2 |
| *Original Stress-Strain* | | | | |
| Cured 30' at 320° F. | | | | |
| Tensile, psi | 2350 | 2270 | 2290 | 2450 |
| Elongation (Percent) | 295 | 370 | 290 | 290 |
| 50% Modulus | 430 | 300 | 375 | 450 |
| 100% Modulus | 800 | 550 | 725 | 850 |
| 200% Modulus | 1800 | 1250 | 1650 | 1860 |
| Durometer, D | 33 | 29 | 31 | 33 |
| *Aged 120 Hours at 257° F. (% Change)* | | | | |
| Tensile | 1950 (−17) | 2175 (−4) | 2050 (−10) | 2250 (−8) |
| Elongation | 75 (−75) | 215 (−42) | 155 (−47) | 145 (−50) |
| 50% Modulus | 1325 (+208) | 600 (+100) | 700 (+87) | 920 (+104) |
| 100% Modulus | 800 | 1100 (+100) | 1350 (+86) | 1700 (+100) |
| Durometer, D | 41 (8 pts) | 35 (6 pts) | 35 (4 pts) | 38 (5 pts) |
| 250° F. "C" Tear | 73 | | 72 | 98 |
| *DYNAMIC INSTRON* | | | | |
| Compressive Modulus | 997 | 735 | 820 | 897 |
| Hysteresis | 7.3 | 8.8 | 8.9 | 7.1 |
| D.Q. | 13.6 | 8.4 | 9.2 | 12.5 |
| Mooney Scorch at 275° F. | | | | |
| $T_1$ (time in min.) | 6.8 | 8.2 | 13.0 | 14.9 |
| $T_{10}$ (time in min.) | 10.5 | 10.6 | 17.9 | 22.4 |
| Min. (torgue units) | 18.75 | 16.0 | 16.0 | 17.75 |

Table 1, 2 and 3 illustrate the properties of a composition that has not been loaded with fiber, whereas Table 4 illustrates the properties of compositions which have been loaded with fiber. Table 4 again shows the effect of di-morpholino disulfide used with N,N'-m-phenyl dimaleimide or N-methyl-2 thiazolidinethione for increase scorch safety of high viscosity fiber filled compositions. The $T_1$ values for the compositions show that a significant increase in scorch time of 9.2 minutes for (D-44) to 19.2 minutes for (D-42) can be obtained without sacrificing physical properties. Compare, for instance, the 10% Modulus values of 1800 for (D-44) to 1800 for (D-42) which is the inventive composition.

TABLE 4

EFFECT OF SULFASAN R/MVA ON 40 PMR NYLON FILLED NEOPRENE COMPOUNDS

|  | D-44 | D-40 | D-42 |
|---|---|---|---|
| Db-9011 | | | |
| Neoprene GRT | 100 | 100 | 100 |
| N650 | 27 | 27 | 27 |
| Silica | 15 | 15 | 15 |
| Oil | 8 | 8 | 8 |
| MgO | 4 | 4 | 4 |
| Stearic Acid | 1.5 | 1.5 | 1.5 |
| ODP | 3 | 3 | 3 |
| SRF 1501 | 1.7 | 1.7 | 1.7 |
| ¼" Nylon | 40 | 40 | 40 |
| Polymel 7 | 6 | 6 | 6 |
| HMMM | 6.7 | 6.7 | 6.7 |
| ZnO | 5 | 5 | 5 |
| Sulfur | 1 | 1 | 1 |
| ETU | 0.25 | — | — |
| MBTS | 0.75 | — | — |
| Vulkacit CRV | — | 0.5 | — |
| HVA-2 | — | — | 2.0 |
| Sulfasan R | — | 4.0 | 4.0 |
| Mooney Scorch at 275° F. | | | |
| $T_1$ (time in min.) | 9.2 | 16.0 | 19.2 |
| $T_{10}$ (time in min.) | 16.2 | 4 @ 24' | 2 @ 24' |
| Min. (torque units) | 19.25 | 17.0 | 17.0 |
| Original Stress-Strain | | | |
| Cured 30' at 320° F. | MD / CMD | MD / CMD | MD / CMD |
| Tensile, psi | 1450 / 5400 | 1325 / 5500 | 1260 / 4850 |
| Elongation (%) | 85 / 52 | 75 / 58 | 75 / 47 |
| 10% Modulus | 400 / 1800 | 390 / 1600 | 400 / 1800 |
| 20% Modulus | 550 / 2750 | 590 / 2550 | 575 / 2820 |
| 50% Modulus | 975 / 5375 | 1025 / 5050 | 950 / 5400 |
| Durometer, D | 43 | 45 | 45 |
| DYNAMIC INSTRON | | | |
| Compressive Modulus | 1751 | 1660 | 1542 |
| Hysteresis | 7.9 | 9.0 | 9.3 |
| D.Q. | 22.3 | 18.5 | 16.6 |

CMD as used herein means the orientation of the fiber is in the cross machine direction.
MD means that the fiber is oriented in the machine direction.

In addition, in a composition as shown in Table 4, it is possible to utilize reinforcing fillers up to 250 phr by weight of materials selected from carbon black, amorphous silica, activated clay and chopped fibers and/or mixtures thereof.

While present embodiments of this invention and methods of practicing the same have been illustrated and described, it will be recognized that this invention may be otherwise variously embodied and practiced within the scope of the following claims.

What is claimed is:

1. In a polymeric composition comprising a chloroprene elastomer, octylated diphenylamine, at least one metallic oxide selected from the group consisting of ZnO and MgO, at least one organic acid, carbon black, at least one accelerator and a retarder, the improvement wherein said retarder is dimorpholino-disulfide and said composition has increased scorch safety while maintaining high ODR torque, cured tensile modulus, and dynamic quotient.

2. The polymeric composition of claim 1 wherein said carbon black is present in an amount of about 10 to 50 phr by weight.

3. The polymeric composition of claim 1 wherein said retarder comprises up to 10 phr dimorpholino-disulfide of said composition, by weight.

4. The polymeric composition of claim 1 wherein said retarder comprises from 0.1 to 6 phr dimorpholino-disulfide of said composition, by weight.

5. The polymeric composition of claim 1 wherein said accelerator is selected from the group comprising N-N'-phenylene dimaleimide and N-methyl-2 thiazolidinethione.

6. The polymeric composition of claim 1 wherein said accelerator comprises up to 10 phr N-N'-phenylene dimaleimide, by weight.

7. The polymeric composition of claim 1 wherein said accelerator comprises up to 10 phr N-methyl-2 thiazolidinethione, by weight.

8. The polymeric composition of claim 1 wherein said accelerator comprises from 0.1 to 6 phr N-N'-phenylene dimaleimide, by weight.

9. The polymeric composition of claim 1 wherein said accelerator comprises from 0.1 to 6 phr N-methyl 2 thiazolidinethione, by weight.

10. The polymeric composition of claim 1 wherein said composition additionally includes chopped fibers and said chopped fibers are selected from the group consisting of aramid, nylon, polyester, fiberglass, rayon, cotton and graphite.

11. In a method of producing a polymeric composition comprising the steps of mixing a chloroprene elastomer, metallic oxides selected from the group consisting of ZnO and MgO, carbon black, octylated diphenylamine and an organic acid and incorporating an accelerator therein; improvement comprising the step of incorporating therein a dimorpholino-disulfide retarder, said composition having increased scorch safety while retaining high ODR torque, cured tensile modulus, and dynamic quotient.

12. The method of claim 11 comprising the further step of incorporating up to 10 phr by weight of said retarder in said composition.

13. The method of claim 11 comprising the further step of incorporating 0.1 to 6 phr by weight of said retarder in said composition.

14. The method of claim 11 comprising the further step of selecting said accelerator from the group comprising N-N'-phenylene dimaleimide and N-methyl-2 thiazolidinethione.

15. In a chloroprene composition incorporating about 20 to 40 phr fiber useful in a power transmission belt, said composition comprising chloroprene, fibers, a metallic oxide selected from the group consisting of ZnO and MgO, an organic acid, an accelerator selected from the group consisting of N,N'-phenylene dimaleimide and N-methyl-2-thiazolidinethione and a retarder, the improvement wherein said retarder is dimorpholino-disulfide and said composition has increased scorch safety while retaining high ODR torque, cured tensile modulus, and dynamic quotient.

16. The chloroprene composition of claim 15 wherein said retarder comprises up to 10 phr dimorpholino-disulfide of said composition by weight.

17. The chloroprene composition of claim 15 wherein said retarder comprises from 0.1 to 6 phr dimorpholino-disulfide of said composition by weight.

18. The chloroprene composition of claim 15 wherein said accelerator comprises up to 10 phr N,N'-phenylene dimaleimide by weight.

19. The chloroprene composition of claim 15 wherein said accelerator comprises up to 10 phr N-methyl-2-thiazolidinethione by weight.

20. The chloroprene composition of claim 15 wherein said accelerator comprises from 0.1 to 6 phr N,N'-phenylene dimaleimide by weight.

21. The chloroprene composition of claim 15 wherein said accelerator comprises from 0.1 to 6 phr N-methyl-2-thiazolidinethione by weight.

22. The chloroprene composition of claim 15 wherein said chopped fibers are selected from the group consisting of aramid, nylon, polyester, fiberglass, rayon, cotton and graphite.

* * * * *